United States Patent [19]

Nelson

[11] Patent Number: 4,707,892
[45] Date of Patent: Nov. 24, 1987

[54] FISH ROD TRANSPORT CLAMP

[76] Inventor: Donald C. Nelson, 1317 N. 8th St., Tacoma, Wash. 98403

[21] Appl. No.: 596,239

[22] Filed: Apr. 2, 1984

[51] Int. Cl.⁴ .................. A44B 21/00; A01K 87/02
[52] U.S. Cl. .................................. 24/336; 24/338; 43/25.2; 403/188; 403/319
[58] Field of Search .............. 24/129 A, 336, 338, 24/130, 573, 305, 30.5 S; 248/74.3; 403/188, 391; 43/25.2

[56] References Cited

U.S. PATENT DOCUMENTS

| 1,050,771 | 1/1913 | Leupold | 24/130 |
| 2,825,992 | 3/1958 | Miller | 43/25.2 |
| 3,036,398 | 5/1962 | Gagner | 43/25.2 |
| 3,354,517 | 11/1967 | Levinsky | 403/391 |
| 3,425,150 | 2/1969 | Braese | 43/25.2 |
| 3,483,996 | 12/1969 | Scammon | 24/336 |
| 3,484,980 | 12/1969 | Wait | 43/25.2 |
| 3,488,432 | 1/1970 | Fernandes et al. | 403/391 |
| 3,521,332 | 7/1970 | Kramer | 403/188 |
| 3,875,623 | 4/1975 | Johnston | 24/57.3 |

FOREIGN PATENT DOCUMENTS 688260 3/1953 United Kingdom ............ 24/129 A

Primary Examiner—Victor N. Sakran
Attorney, Agent, or Firm—Kenneth S. Kessler

[57] ABSTRACT

A clamping device is illustrated for securing the elements of a fishing pole, once the extensions have been taken apart.

5 Claims, 4 Drawing Figures

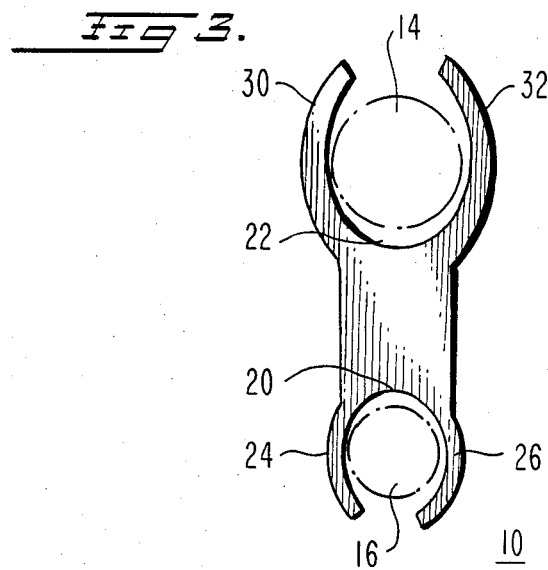
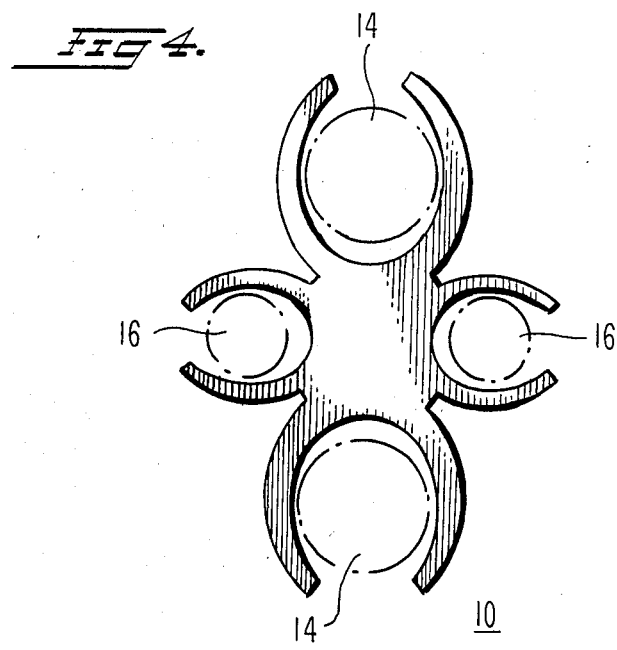

FISH ROD TRANSPORT CLAMP

SUMMARY OF THE INVENTION

When a fishing pole is broken down, a series of rod elements are left. The fisherman needs to be able to secure the elements.

The present clamping device allows the rods to be secured in the clamps making one unit transportable. The clamping device is made of sufficiently pliable material that the rods may be fit within the clamping device. Once within the clamping device, the jaws of the clamping device are strong enough to hold the rods secure.

BRIEF DESCRIPTION OF THE DRAWINGS

FIG. 3 is an overhead view of the fish rod clamping device.

FIG. 4 is an overhead view of a clustered combination of clamping semi-circles.

DETAILED DESCRIPTION OF THE DRAWINGS

Figure 1:
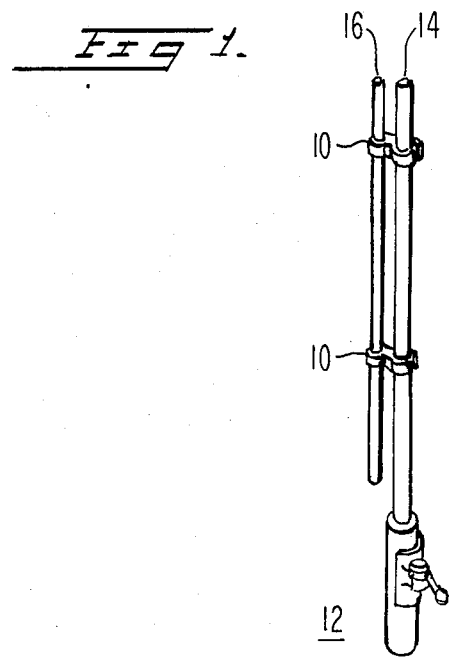
FIG. 1 is a side view of the fish rod's two components apart and clamped together with the fish rod clamping device.

In FIG. 1, the fish rod clamping device 10 is illustrated, clamping the two components of the fish rod 12 together; i.e., the main body 14 to the fish rod extension 16. As illustrated, the fish rod 12 has been disengaged from the fish rod extension 16 as is normally done when the fisherman has either finished for the day or is moving on to a new fishing hole. After the two portions of the fishing rod have been disengaged, the fish rod extension 16 is secured within the fish rod clamping device.

Figure 2:
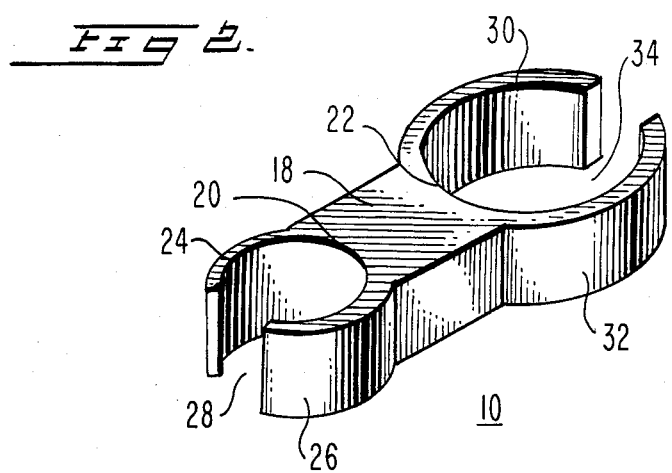
FIG. 2 is a perspective view of the fish rod clamping device.

In FIG. 2, a perspective view of the fish rod clamping device 10 illustrates the support base 18 from which two clamping semi-circles 20 and 22 extend. The clamping semi-circles 20 and 22 extend from the opposing sides of the support base 18.

As set forth in FIGS. 2 and 3, clamping semi-circle 20 includes semi-circular jaw 24 and opposing semi-circular jaw 26. The two semi-circular opposing jaws, define a clamping semi-circular cavity 28. The clamping semi-circle 22 is similarly defined by semi-circular jaw 30 and opposing semi-circular jaw 32, which also define a clamping semi-circular cavity 34.

Both the clamping semi-circles 20 and 22 and their respective jaws are made of material which is sufficiently pliable to allow the user to expand the jaws outward to allow an object within the clamping semi-circular cavity, but which return to their original shape, thereby holding the object secure.

In the present invention, the fish rod main body 14, for example, is pushed into the clamping semi-circle 20. This is allowed, for the opposing semi-circular jaws 24 and 26 give sufficiently and extend outwardly a sufficient distance to allow the fish rod main body 14 to be positioned within the clamping semi-circular circle. However, once the main body 14 is in position, the opposing jaws have once again wrapped around the rod and clamped the fish rod main body 14 secure. Once the fish rod main body is held in position, the user utilizes the same procedure to secure the fish rod extension 16.

It is to be understood, that although in the preferred embodiment, the clamping semi-circles are of different sizes, they can be the same size, or the size differential can be greater than the example illustrated. In addition it is to be understood that the support base can support clamping semi-circles extending at varied angles and at varying numbers of clamping semi-circles. Thus, the clamping semi-circles could be positioned in a varied configuration of clusters as illustrated in FIG. 4.

I claim:

1. A fish rod clamping device for the clamping of the disconnectable sections of a fishing rod in parallel alignment comprising:
    a pliable semi-circular jaw;
    an opposing pliable semi-circular jaw;
    a means of attaching the semi-circular jaws to each other;
    a second semi-circular jaw;
    a pliable semi-circular jaw positioned in opposition to the second semi-circular jaw;
    a means of attaching the second set of semi-circular jaws to each other; and
    a means of securing the two sets of jaws to each other.

2. The fish rod clamping device of claim 1 wherein the means for attaching the semi-circular jaws to each other comprise both jaws manufactured from one continuous piece of material.

3. The fish rod clamping device of claim 1 wherein the means for securing the two sets of jaws to each other comprises a wall capable of attaching to both sets of jaws.

4. The fish rod clamping device of claim 3 wherein the continuous piece of material which comprises both jaws is pliable.

5. The fish rod clamping device of claim 3 wherein the first and second semi-circular jaws do not fully close when the jaws are not securing an object.

* * * * *